Jan. 6, 1953 K. Y. MESSICK 2,624,477
POWER-OPERATED ELEVATOR AND TAIL GATE
Filed June 20, 1949 2 SHEETS—SHEET 1
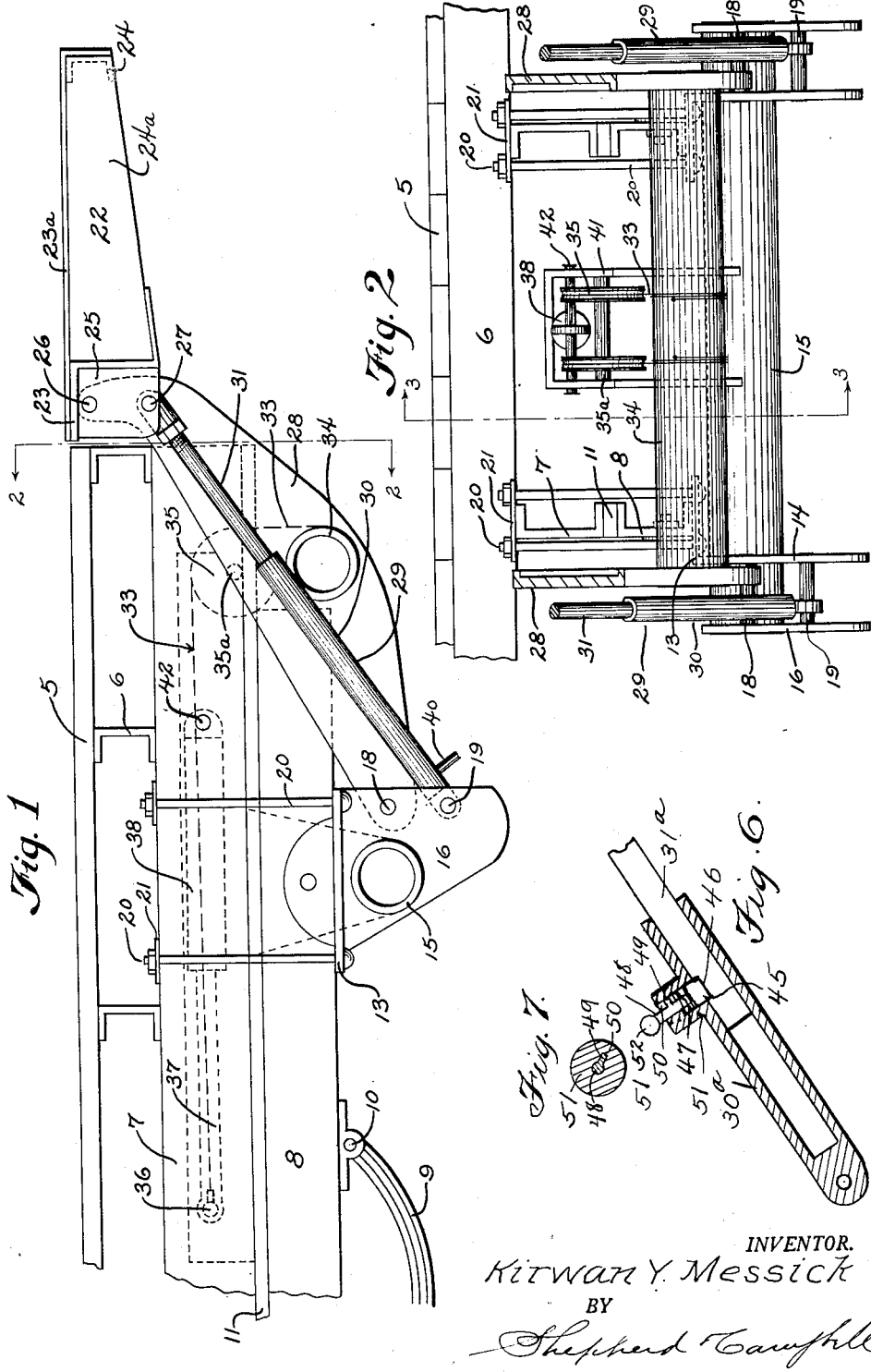
INVENTOR.
Kirwan Y. Messick
BY
Shepherd Cawthill Jan. 6, 1953 K. Y. MESSICK 2,624,477
POWER-OPERATED ELEVATOR AND TAIL GATE
Filed June 20, 1949 2 SHEETS—SHEET 2
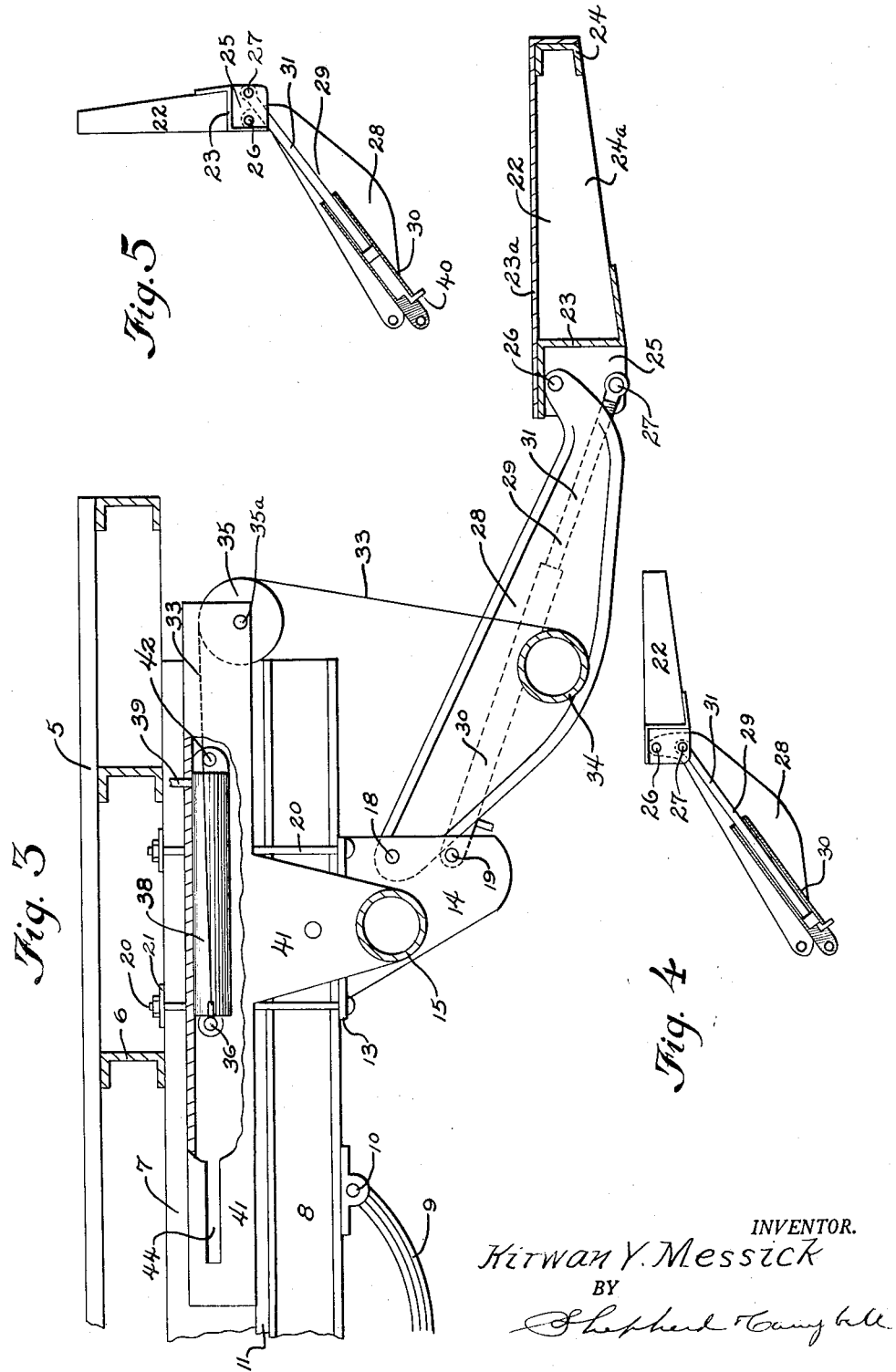
INVENTOR.
Kirwan Y. Messick
BY
Shepherd Campbell Patented Jan. 6, 1953

2,624,477

UNITED STATES PATENT OFFICE 2,624,477

POWER-OPERATED ELEVATOR AND TAIL GATE

Kirwan Y. Messick, Arlington, Va., assignor of one-fourth to Frank G. Campbell, Arlington County, Va.

Application June 20, 1949, Serial No. 100,245

7 Claims. (Cl. 214—77)

This invention relates to a combined power operated elevator and tail gate for motor trucks and it has for its object to provide a device of this character comprising a tail gate forming member or platform and power means for lowering said platform to lie close to the ground for the easy placement of a load thereon; for swinging the platform and the load upwardly to the level of the floor of the truck where the load may easily be moved on to the floor of the truck; for maintaining the platform substantially horizontal during such upward swinging movement and for thereafter swinging the platform, by power, to a vertical or tail gate forming position.

I am aware of the fact that structures have heretofore been proposed which accomplish the above recited objects. My invention aims to provide markedly improved means for accomplishing the desired results through instrumentalities which are much simpler and of much less cost than the devices heretofore proposed.

The importance of my invention will be best appreciated if it is remembered that excessive size and weight of the parts employed is to be avoided, because every pound added to the weight of the truck and its appurtenances, reduces the pay load capacity of the truck to a corresponding degree. Further increased size and weight of the parts employed necessarily implies increased cost of manufacture.

The means which I employ to reduce weight and cost; to avoid excessive strain upon any given part in operation and to facilitate the quick and easy lifting and closing of the tail gate will be best understood after consideration of the accompanying drawings wherein:

Fig. 1 is a side elevation of the rear portion of a truck equipped with the device of my invention;

Fig. 2 is a transverse sectional view on line 2—2 of Fig. 1;

Fig. 3 is a vertical sectional view on line 3—3 of Fig. 2;

Fig. 4 is a diagrammatic view showing the relative positions of the lifting and supporting arms when the elevating platform is being lifted and the piston of a hydraulic cylinder is bottomed in said cylinder;

Fig. 5 is a diagrammatic view illustrating the lifting and supporting arms in the position they occupy when the platform has been raised to tail gate forming position;

Fig. 6 is a fragmentary view of a pair of telescopic arms corresponding to those of Fig. 5 showing a latch which may be employed to lock the tail gate in the position of Fig. 5; and Fig. 7 is a detail sectional view of Fig. 6.

Like numerals designate corresponding parts in all of the figures of the drawing.

In the drawings 5 designates the bed or floor of a conventional motor truck. This floor is supported upon a series of transverse channel irons 6. Sills 7 preferably of channel iron formation complete the body structure. This body structure is supported upon a conventional truck chassis, the longitudinal frame members 8, of which, have the truck springs 9 attached thereto at 10. Wooden cushioning strips 11 may be inserted between the members 7 and 8.

The hangers to which the inner ends of the platform lifting and operating arms are pivoted comprise angle plates made up of the horizontal webs 13 and the vertical webs 14. A stout torque tube 15 extends crosswise of the truck, passes through the webs 14, to which it is securely welded, and has welded to its outer ends the vertical webs 16. Upper pivots 18 and lower pivots 19 span the spaces between the webs 14 and 16 and are supported by said webs. The webs 13 rest against the underside of the channels 8 and are bound forcibly against said channels by the action of draw bolts and nuts 20 the lower ends of the bolts passing through webs 13 and the upper ends of the bolts passing through plates 21 which overlie channels 7. Thus the strength of both channels 7 and 8 is available for the support of the brackets.

The load lifting and tail gate forming platform is indicated at 22. This platform may be made in many different ways to secure rigidity and strength. In the particular form shown it comprises a heel plate 23 of generally Z shape in cross section, a flat floor section 23a, a front web 24 and any desired number of stiffening structural shapes 24a extending between and secured to heel plate 23 and web 24. Vertical webs 25 carried by the heel plate provide mountings for upper pivots 26 and lower pivots 27.

The lifting and operating mechanism for the platform comprises a plurality of arms or links, to wit: a pair of lifting arms 28, pivoted at their outer ends by the pivots 26 to a web 25 of the platform, and a pair of platform supporting and tipping arms 29 extensible under hydraulic power, pivoted at their inner ends to pivots 19 and pivoted at their outer ends to lower pivots 27 of a vertical web 25 of the platform. The arms 29 are each made up of a hydraulic cylinder 30 and piston 31. With this arm contracted, that is, with the piston moved into and bottomed in the cylinder the resultant arm or link corresponds in effective length to the arms 28 so that a line drawn to pass through the pivot points 18, 19, 26 and 27 will describe a parallelogram and the parallel relation of the arms 28 and 29 will continue throughout the movement of the platform from the position of Fig. 3 to the position of Fig. 1. This in turn keeps the platform in a horizontal position throughout the lifting operation. Since the arms 28 swing from their inner ends and support the load at their outer ends it follows that if power to lift these arms be applied at or near their inner pivot points the resultant strain, twist or torque would be very great. To lift a heavy object placed on the platform by power applied at or near the inner pivot point of the arms would require a great deal more power than if the lifting be done by a direct vertical pull applied at a point between load and pivot and at a point spaced materially away from the pivot toward the load. To make it possible to do this and to apply this lifting power at spaced points across the width of the truck I provide a pair of cables 33 the lower ends of which are given one or more turns around a stout torque tube 34, which extends between and has its ends securely welded to arms 28, at a point well removed from pivots 18 toward pivots 26. After being given one or more turns about the torque tube the ends of the cables are fixed to said tube by any suitable type of clamp or bolt. The cables 33 pass upwardly over idler pulleys 35, and then forwardly and have their forward ends attached to a transverse bar 36 that is carried by the outer end of a piston rod 37 of a hydraulic cylinder 38. Pressure fluid from any suitable type of pump is supplied to the hydraulic cylinders in a way common in dump trucks the pipes for said pressure fluid being indicated at 39 for cylinder 38 and at 40 for cylinders 30.

For supporting the idler pulleys 33 and the cylinder 38 spaced webs 41 are welded upon torque tube 15. These webs receive and support the journal 35a of the pulleys and also receive and support a transverse rod 42 by which hydraulic cylinder 38 is carried. The ends of transverse rod 36 may be mounted to slide in guide slots 44 of webs or channel 41.

When pressure fluid is admitted to cylinder 38 movement of the piston rod, outwardly, draws upon the cables to swing the platform with its load from the position shown in Fig. 3 to the position in Fig. 1. When in the lower position the platform rests close enough to the ground to permit a hand truck to deposit a load thereon without requiring the operator to do any lifting, and when the platform is in the position of Fig. 1 the load may easily be pushed from the platform onto the truck floor 5.

After the loading has been completed the platform is easily and quickly moved to close the rear end of the truck by admitting pressure fluid to cylinders 30. This forces pistons 31 out of their cylinders, increases the effective length of arms 29 and swings the platform upon pivots 26 until it assumes a vertical or tail gate forming position as illustrated in Fig. 5. One of the important advantages of the invention is that the hydraulic cylinders employed are of conventional type, in ample supply at moderate cost and that the connections between these cylinders and the parts operated thereby are simple, inexpensive but very reliable in operation. Applying the lifting action of piston 38 at spaced points upon opposite sides of the center of the truck takes care of situations where the load has been placed upon the platform nearer one end than the other. With only a central lift, twisting strains would ensue under these conditions but the described double lift construction completely takes care of such a condition. While the advantages of lifting from a point well in advance of the pivot points of the lifting arms is important, this feature may or may not be employed without detracting from the advantages of the supporting and tipping arms made up of hydraulic cylinders and pistons to render the arms extensible under power. As far as I am aware I am the first to provide a linkage comprising a pair of arms including a hydraulic cylinder so arranged that with the piston bottomed in the cylinder a parallelogram is created which maintains the platform horizontal during lifting but which is extensible under power to permit the closing of the tail gate without human effort. This is important because the tail gates of big trucks are so heavy that it is a severe task to handle them by hand. Further, this capability of tipping the tail gate or platform from horizontal toward the vertical under power, may be utilized in moving loads from the tail gate onto the truck floor. For example, when handling heavy objects this tipping of the gate may be utilized to also tilt the load onto a hand truck or dolly for movement toward the forward end of the truck floor. Another important advantage flowing from the use of a hydraulic cylinder, and piston (including the piston rod) as first a supporting and then a tipping arm, is that as a supporting arm it is as rigid and strong as a solid bar would be, while as a tipping device it not only tips the platform upwardly to the position of Fig. 5 but if during such upward tipping the hydraulic fluid supply should fail (as for example by a broken pipe or hose connection delivering the fluid to 40 in Fig. 5) the structure would act as a fluid check to prevent any such sudden drop of the platform (tail gate) as might otherwise inflict injury upon the operator.

During the lifting of the load from the ground to truck floor level the weight of the load is on the arms 29 as the outer end of the platform tends to swing downwardly from its pivotal support on arms 28. Since the pistons of arms 29 are bottomed in their respective cylinders, at this time, it follows that they are capable of supporting very heavy loads. The parts described may be attached to truck bodies of conventional construction at a moderate cost and in use will lift and help to distribute a load over the truck floor and will effectively close the open end of the truck in transit.

While I have described the device as being located at the rear of the truck the principles disclosed may be utilized in apparatus for loading material through a side door opening of a vehicle body and thereafter closing such opening.

While I have disclosed both of the cylinders 29 as power cylinders, I may in the case of light trucks apply power only at one side of the structure leaving the corresponding parts at the other side to constitute merely telescopic elements, such as, for example, those indicated in Fig. 6 where cylinder 30a corresponds to cylinder 30 and a rod 31a corresponds to piston 31 and I may incorporate with these parts a lock or latch for holding the tail gate in its closed position. This lock comprises a plunger 45 adapted to enter a notch 46 in rod 31a when said rod reaches its outer limit of movement. Plunger 45 is thrust inwardly by a spring 47. A stem 48 of the plunger carries a pin 49 which rides in a slot 50 of the housing boss 51 of the plunger. By pulling outwardly upon knob 52 of stem 48 and then turning the stem to bring pin 49 out of alignment with the slot, the plunger will be held retracted and out of engagement with notch 46. The tail gate will then be unlocked.

It is to be understood that the invention includes within its purview whatever changes fairly come within either the terms or the spirit of the appended claims.

Having described my invention what I claim is:

1. In a device of the character described the combination with a rigid transverse support of a pair of brackets at the opposite ends of said support, means for clamping said support and brackets to a truck chassis, a pair of upper and lower pivots carried by each of said brackets, a pair of lifting arms having their inner ends mounted upon the upper one of the pivots of each bracket, a pair of telescopic supporting and tipping arms having their inner ends mounted upon the other and lower pivots of the said brackets, a combined lifting platform and tail gate to which the outer ends of the lifting arms and the supporting arms are pivotally connected at spaced points, and hydraulic power means included in the length of and forming part of the supporting arms for extending the effective length of said arms, to swing said platform from horizontal toward vertical tail gate forming position, said arms in their unextended position being substantially equal in length to the supporting arms, a rigid torque tube extending between and rigidly uniting the lifting arms at a point materially spaced from the inner and toward the outer ends of the lifting arms and means for imparting a lifting force to said torque tube.

2. In a device of the character described the combination with a rigid transverse support of a pair of brackets at the opposite ends of said support, means for clamping said support and brackets to a truck chassis, a pair of pivots carried by each of said brackets, a pair of lifting arms having their inner ends mounted upon one of the pivots of each bracket, a pair of supporting and tilting arms having their inner ends mounted upon the other pivot of the said brackets, a combined lifting platform and tail gate to which the outer ends of the lifting arms and the supporting arms are pivotally connected at spaced points, and power means included in the length of and forming part of the supporting arms for extending the effective length of said arms, to swing said platform from horizontal toward vertical tail gate forming position, said arms in their unextended position being substantially equal in length to the supporting arms, a rigid member extending between and rigidly uniting the lifting arms and means for imparting a lifting force to said member, said lifting means exerting its force upon the member upon opposite sides of the center thereof.

3. A structure as recited in claim 2 wherein the lifting means comprises a power cylinder, a piston rod and cables connected to the piston rod and to the member upon opposite sides of the center of the member.

4. A structure as recited in claim 1 in combination with power means mounted upon the first named transverse support and comprising a hydraulic cylinder and piston and cables extending between the piston and the torque tube for effecting an upward lift upon said torque tube at points upon the opposite sides of the center thereof.

5. In a power operated elevator and tail gate for trucks, the combination with a platform dimensioned to close the open rear end of a truck body, a pair of platform lifting arms, means for pivotally supporting said arms at their inner ends from a truck body or chassis, means for pivotally connecting the outer ends of said arms to the platform hydraulic power means and connections between said power means and the lifting arms for lifting said arms, a longitudinally extensible supporting and tipping arm, means for pivotally connecting the inner end of said supporting arm to a truck supported pivot and means for pivotally connecting the outer end of said supporting arm to the platform at a point below the pivotal connection of the lifting arm to the platform and at such a point that extension of the length of the supporting arm swings the platform from horizontal toward vertical tail gate forming position about the pivotal connection between said platform and the lifting arms, and power means included in said supporting arm for forcibly extending it.

6. In a power operated elevator and tail gate for trucks, the combination with a platform dimensioned to close the open rear end of a truck body, a pair of platform lifting arms, means for pivotally supporting said arms at their inner ends from a truck body or chassis hydraulic power means connected to the lifting arms for swinging the outer ends of the lifting arms upwardly, means for pivotally connecting the outer ends of said arms to the platform, a supporting and tipping arm, means for pivotally connecting the inner end of said supporting arm to a truck supported pivot and means for connecting the outer end of said supporting arm to the platform at such a point that extension of the length of the supporting arm swings the platform from horizontal toward vertical tail gate forming position about the pivotal connection between said platform and the lifting arm, said supporting arm being composed of a telescoping hydraulic cylinder and piston, constituting power means for forcibly extending the length of the supporting arm by fluid pressure.

7. In a power operated elevator and tail gate for trucks, the combination with a platform dimensioned to close the open rear end of a truck body, a pair of platform lifting arms, means for pivotally supporting said arms at their inner ends for vertical swinging movement with relation to a truck body, means for pivotally connecting the outer ends of said arms to the platform, a pair of supporting and tipping arms each composed of a telescoping hydraulic cylinder and piston, the overall length of the said arms, when the pistons are bottomed in the cylinders, being such that the lifting and the supporting arms complementally constitute the sides of parallelograms to hold the platform horizontal throughout the upward movement of said lifting and supporting arms, and hydraulic means for swinging the lifting arms upwardly until the platform reaches truck floor level the effective length of the supporting arms being such as to swing the platform upwardly upon its pivotal connections with the lifting arms, to a substantially vertical and tail gate forming position when the pistons are projected from their cylinders by the application of a pressure fluid thereto, the points of pivoting of the lifting arms and of the supporting and tipping arms being such that the supporting arms constitute the lower sides of the parallelograms.

KIRWAN Y. MESSICK.

REFERENCES CITED

The following references are of record in the file of this patent:

UNITED STATES PATENTS

| Number | Name | Date |
|---|---|---|
| 1,929,112 | Hansen | Oct. 3, 1933 |
| 2,075,954 | Osgood | Apr. 6, 1937 |
| 2,348,993 | Novotney | May 16, 1944 |
| 2,367,784 | Knoizen et al. | Jan. 23, 1945 |
| 2,389,221 | Wachter | Nov. 20, 1945 |
| 2,391,813 | Wood | Dec. 25, 1945 |
| 2,456,805 | Wohlforth | Dec. 21, 1948 |
| 2,469,321 | Wood | May 3, 1949 |
| 2,480,528 | Wachter | Aug. 30, 1949 |
| 2,525,424 | Novotney | Oct. 10, 1950 |